United States Patent
Woodard (10) Patent No.: US 8,845,901 B2
(45) Date of Patent: Sep. 30, 2014

(54) BALLASTED ANAEROBIC METHOD FOR TREATING WASTEWATER

(71) Applicant: Siemens Water Technologies LLC, Alpharetta, GA (US)

(72) Inventor: Steven E. Woodard, Cumberland, ME (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 0 days.

(21) Appl. No.: 14/094,447

(22) Filed: Dec. 2, 2013

(65) Prior Publication Data

US 2014/0102977 A1   Apr. 17, 2014

Related U.S. Application Data (60) Division of application No. 13/627,766, filed on Sep. 26, 2012, now Pat. No. 8,623,205, which is a continuation of application No. 12/799,582, filed on Apr. 27, 2010, now abandoned, which is a continuation-in-part of application No. 12/584,545, filed on Sep. 8, 2009, now Pat. No. 8,470,172, which is a continuation-in-part of application No. 12/008,216, filed on Jan. 9, 2008, now Pat. No. 7,695,623.

(60) Provisional application No. 60/994,553, filed on Sep. 20, 2007, provisional application No. 60/879,373, filed on Jan. 9, 2007.

(51) Int. Cl.
C02F 3/00   (2006.01)
C02F 3/28   (2006.01)
C02F 1/52   (2006.01)
C02F 1/56   (2006.01)
C02F 1/48   (2006.01)
C02F 1/38   (2006.01)
C02F 1/36   (2006.01)

(52) U.S. Cl.
CPC ............. *C02F 3/2846* (2013.01); *C02F 1/5236* (2013.01); *C02F 1/56* (2013.01); *C02F 1/488* (2013.01); *C02F 1/38* (2013.01); *C02F 1/36* (2013.01); *C02F 2305/12* (2013.01)
USPC ........................... 210/616; 210/631; 210/768

(58) Field of Classification Search
USPC ......................................... 210/616, 631, 768
See application file for complete search history.

(56) References Cited

U.S. PATENT DOCUMENTS

| 438,579 A | 10/1890 | Faunce et al. |
|---|---|---|
| 531,183 A | 12/1894 | Harris |

(Continued)

FOREIGN PATENT DOCUMENTS

| CN | 1686862 A | 10/2005 |
|---|---|---|
| CN | 101186410 A | 5/2008 |

(Continued)

OTHER PUBLICATIONS

U.S. Appl. No. 13/946,204, filed Jul. 19, 2013.

(Continued)

*Primary Examiner* — Chester Barry (57) ABSTRACT

A ballasted anaerobic system for treating wastewater including at least one anaerobic treatment reactor. A weighting agent impregnation subsystem is configured to mix weighting agent with the biological flocs to form weighted biological flocs to create a weighted anaerobic sludge blanket in the at least one anaerobic treatment reactor. A weighting agent recovery subsystem is configured to recover the weighting agent from excess sludge and reintroduce the weighting agent to the weighting agent impregnation subsystem.

7 Claims, 9 Drawing Sheets

(56) References Cited

U.S. PATENT DOCUMENTS

| | | |
|---|---|---|
| 653,010 A | 7/1900 | Koyl |
| 728,062 A | 5/1903 | Wilson |
| 1,064,807 A | 6/1913 | Yost |
| 1,310,461 A | 7/1919 | Williams |
| 1,383,287 A | 7/1921 | Campbell |
| 1,401,288 A | 12/1921 | Sodeau |
| 1,948,080 A | 2/1934 | Thomas |
| 2,065,123 A | 12/1936 | Downes |
| 2,129,267 A | 9/1938 | Fischer |
| 2,232,294 A | 2/1941 | Urbain et al. |
| 2,232,296 A | 2/1941 | Urbain et al. |
| 2,268,461 A | 12/1941 | Nichols |
| 2,326,575 A | 8/1943 | Stearns |
| 2,359,748 A | 10/1944 | Clemens |
| 2,391,494 A | 12/1945 | Walker |
| 2,401,924 A | 6/1946 | Goetz |
| 2,564,515 A | 8/1951 | Vogel |
| 2,597,561 A | 5/1952 | Blind |
| 2,652,925 A | 9/1953 | Vermeiren |
| 2,713,028 A | 7/1955 | Jenks |
| 2,758,715 A | 8/1956 | Fowler |
| 2,825,464 A | 3/1958 | Mack |
| 2,945,590 A | 7/1960 | Stearns |
| 3,066,095 A | 11/1962 | Hronas |
| 3,080,264 A | 3/1963 | Zimmie |
| 3,142,638 A | 7/1964 | Blaisdell et al. |
| 3,228,878 A | 1/1966 | Moody |
| 3,350,302 A | 10/1967 | Demeter et al. |
| 3,575,852 A | 4/1971 | Hughes |
| 3,617,561 A | 11/1971 | Fanselow |
| 3,622,461 A | 11/1971 | Wagner et al. |
| 3,627,678 A | 12/1971 | Marston et al. |
| 3,676,337 A | 7/1972 | Kolm |
| 3,690,454 A | 9/1972 | Bekhtle et al. |
| 3,693,795 A | 9/1972 | Robinson et al. |
| 3,697,420 A | 10/1972 | Blaisdell et al. |
| 3,767,351 A | 10/1973 | Blaser |
| 3,819,589 A | 6/1974 | Fauke et al. |
| 3,856,666 A | 12/1974 | Yashima et al. |
| 3,886,064 A | 5/1975 | Kosonen |
| 3,887,457 A | 6/1975 | Marston et al. |
| 3,920,543 A | 11/1975 | Marston et al. |
| 3,929,632 A | 12/1975 | Buriks et al. |
| 3,929,635 A | 12/1975 | Buriks et al. |
| 3,950,319 A | 4/1976 | Schmidt et al. |
| 3,951,807 A | 4/1976 | Sanderson |
| 3,959,133 A | 5/1976 | Fulton |
| 3,983,033 A | 9/1976 | de Latour |
| 4,024,040 A | 5/1977 | Phalangas et al. |
| 4,025,432 A | 5/1977 | Nolan et al. |
| 4,033,864 A | 7/1977 | Nolan et al. |
| 4,046,681 A | 9/1977 | Marston et al. |
| 4,066,991 A | 1/1978 | Marston et al. |
| 4,089,779 A | 5/1978 | Neal |
| 4,110,208 A | 8/1978 | Neal |
| 4,139,456 A | 2/1979 | Yabuuchi et al. |
| 4,142,970 A | 3/1979 | von Hagel et al. |
| 4,151,090 A | 4/1979 | Brigante |
| 4,153,559 A | 5/1979 | Sanderson |
| 4,167,480 A | 9/1979 | Mach |
| 4,176,042 A | 11/1979 | Fahlstrom |
| 4,190,539 A | 2/1980 | Besik |
| 4,193,866 A | 3/1980 | Slusarczuk et al. |
| 4,204,948 A | 5/1980 | Wechsler et al. |
| 4,274,968 A | 6/1981 | Grutsch et al. |
| 4,290,898 A | 9/1981 | von Hagel et al. |
| 4,297,484 A | 10/1981 | Quinlan |
| 4,320,012 A | 3/1982 | Palm et al. |
| 4,339,347 A | 7/1982 | Quinlan |
| 4,341,657 A | 7/1982 | Quinlan |
| 4,343,730 A | 8/1982 | Becker et al. |
| 4,357,237 A | 11/1982 | Sanderson |
| 4,358,382 A | 11/1982 | Quinlan |
| 4,359,382 A | 11/1982 | Morgan |
| 4,377,483 A | 3/1983 | Yamashita et al. |
| 4,388,195 A | 6/1983 | von Hagel et al. |
| 4,402,833 A | 9/1983 | Bennett et al. |
| 4,454,047 A | 6/1984 | Becker et al. |
| 4,465,597 A | 8/1984 | Herman et al. |
| 4,482,459 A | 11/1984 | Shiver |
| 4,502,958 A | 3/1985 | Sasaki |
| 4,522,643 A | 6/1985 | Quinlan |
| 4,563,286 A | 1/1986 | Johnson et al. |
| 4,579,655 A | 4/1986 | Louboutin et al. |
| 4,588,508 A | 5/1986 | Allenson et al. |
| 4,595,506 A | 6/1986 | Kneer |
| 4,626,354 A * | 12/1986 | Hoffman et al. ............... 210/603 |
| 4,654,139 A | 3/1987 | Baba et al. |
| 4,655,933 A | 4/1987 | Johnson et al. |
| 4,686,035 A | 8/1987 | Estabrook |
| 4,689,154 A | 8/1987 | Zimberg |
| 4,699,951 A | 10/1987 | Allenson et al. |
| 4,735,725 A | 4/1988 | Reischl et al. |
| 4,752,401 A | 6/1988 | Bodenstein |
| 4,765,900 A | 8/1988 | Schwoyer et al. |
| 4,765,908 A | 8/1988 | Monick et al. |
| 4,783,265 A | 11/1988 | Timmons |
| 4,795,557 A | 1/1989 | Bourbigot et al. |
| 4,827,890 A | 5/1989 | Pociask et al. |
| 4,843,105 A | 6/1989 | Reischl et al. |
| 4,849,128 A | 7/1989 | Timmons et al. |
| 4,851,123 A | 7/1989 | Mishra |
| 4,864,075 A | 9/1989 | Thompson et al. |
| 4,872,993 A | 10/1989 | Harrison |
| 4,874,508 A | 10/1989 | Fritz |
| 4,882,064 A | 11/1989 | Dixon et al. |
| 4,921,597 A | 5/1990 | Lurie |
| 4,921,613 A | 5/1990 | Nordberg et al. |
| 4,927,543 A | 5/1990 | Bablon et al. |
| 4,938,876 A | 7/1990 | Ohsol |
| 4,940,550 A | 7/1990 | Watson |
| 4,944,278 A | 7/1990 | Woodard |
| 4,944,279 A | 7/1990 | Woodard |
| 4,956,099 A | 9/1990 | Thompson et al. |
| 4,981,593 A | 1/1991 | Priestley et al. |
| 5,009,791 A | 4/1991 | Lin et al. |
| 5,013,451 A | 5/1991 | Thompson et al. |
| 5,019,274 A | 5/1991 | Thompson et al. |
| 5,023,012 A | 6/1991 | Buchan et al. |
| 5,026,483 A | 6/1991 | Thompson et al. |
| 5,055,194 A | 10/1991 | Goetz et al. |
| 5,064,531 A | 11/1991 | Wang et al. |
| 5,069,783 A | 12/1991 | Wang et al. |
| 5,084,733 A | 1/1992 | Katoh et al. |
| 5,089,120 A | 2/1992 | Eberhardt |
| 5,089,227 A | 2/1992 | Thompson et al. |
| 5,089,619 A | 2/1992 | Thompson et al. |
| 5,112,494 A | 5/1992 | Yan |
| 5,112,499 A | 5/1992 | Murray et al. |
| 5,149,438 A | 9/1992 | Hebert |
| 5,187,326 A | 2/1993 | Shirai |
| 5,234,603 A | 8/1993 | Potts |
| 5,266,200 A | 11/1993 | Reid |
| 5,298,168 A | 3/1994 | Guess |
| 5,310,642 A | 5/1994 | Vargas et al. |
| 5,369,072 A | 11/1994 | Benjamin et al. |
| 5,377,845 A | 1/1995 | Hamen et al. |
| 5,383,539 A | 1/1995 | Bair et al. |
| 5,395,527 A | 3/1995 | Desjardins |
| 5,397,476 A | 3/1995 | Bradbury et al. |
| 5,462,670 A | 10/1995 | Guess |
| 5,545,330 A | 8/1996 | Ehrlich |
| 5,560,493 A | 10/1996 | Perry |
| 5,593,590 A | 1/1997 | Steyskal |
| 5,595,666 A | 1/1997 | Kochen et al. |
| 5,596,392 A | 1/1997 | Danzuka |
| 5,597,479 A | 1/1997 | Johnson |
| 5,616,241 A | 4/1997 | Khudenko |
| 5,616,250 A | 4/1997 | Johnson et al. |
| 5,637,221 A | 6/1997 | Coyne |
| 5,693,461 A | 12/1997 | Bagchi et al. |
| 5,702,809 A | 12/1997 | Tixier et al. |
| 5,730,864 A | 3/1998 | Delsalle et al. |
| 5,731,134 A | 3/1998 | Honan et al. |

(56) References Cited

U.S. PATENT DOCUMENTS

| | | |
|---|---|---|
| 5,770,091 A | 6/1998 | Binot et al. |
| 5,779,908 A | 7/1998 | Anderson et al. |
| 5,800,717 A | 9/1998 | Ramsay et al. |
| 5,805,965 A | 9/1998 | Tsuda et al. |
| 5,840,195 A | 11/1998 | Delsalle et al. |
| 5,856,072 A | 1/1999 | Leone et al. |
| 5,893,355 A | 4/1999 | Glover et al. |
| 5,925,290 A | 7/1999 | Hills |
| 5,976,375 A | 11/1999 | Dorica et al. |
| 5,976,771 A | 11/1999 | Kosugi et al. |
| 6,010,631 A | 1/2000 | Delsalle et al. |
| 6,030,761 A | 2/2000 | Taguchi et al. |
| 6,093,318 A | 7/2000 | Saho et al. |
| 6,099,738 A | 8/2000 | Wechsler et al. |
| 6,149,014 A | 11/2000 | Mankosa et al. |
| 6,151,467 A | 11/2000 | Yamaguchi |
| 6,160,976 A | 12/2000 | Karakama et al. |
| 6,185,393 B1 | 2/2001 | Karakama et al. |
| 6,210,587 B1 | 4/2001 | Vion |
| 6,210,588 B1 | 4/2001 | Vion |
| 6,221,253 B1 | 4/2001 | Fukase et al. |
| 6,221,262 B1 | 4/2001 | MacDonald et al. |
| 6,228,269 B1 | 5/2001 | Cort |
| 6,228,565 B1 | 5/2001 | Ohzeki et al. |
| 6,251,576 B1 | 6/2001 | Taguchi et al. |
| 6,277,285 B1 | 8/2001 | Vion |
| 6,290,849 B1 | 9/2001 | Rykaer et al. |
| 6,379,549 B1 | 4/2002 | LePoder et al. |
| 6,383,370 B1 | 5/2002 | Keever et al. |
| 6,386,781 B1 | 5/2002 | Gueret |
| 6,406,624 B1 | 6/2002 | DeVos |
| 6,423,485 B1 | 7/2002 | Yamada et al. |
| 6,432,303 B1 | 8/2002 | Chesner et al. |
| 6,447,686 B1 | 9/2002 | Choi et al. |
| 6,472,132 B1 | 10/2002 | Yamada et al. |
| 6,485,652 B1 | 11/2002 | Le Poder et al. |
| 6,517,714 B2 | 2/2003 | Streat |
| 6,576,145 B2 | 6/2003 | Conaway et al. |
| 6,613,232 B2 | 9/2003 | Chesner et al. |
| 6,645,386 B1 | 11/2003 | Moreau et al. |
| 6,689,277 B2 | 2/2004 | Streat |
| 6,692,173 B2 | 2/2004 | Gueret |
| 6,706,467 B2 | 3/2004 | Howe et al. |
| 6,740,245 B2 | 5/2004 | Johnson |
| 6,759,018 B1 | 7/2004 | Arno et al. |
| 6,783,679 B1 | 8/2004 | Rozich |
| 6,811,885 B1 | 11/2004 | Andriessen et al. |
| 6,824,692 B2 | 11/2004 | Binot et al. |
| 6,832,691 B2 | 12/2004 | Miles et al. |
| 6,875,351 B2 | 4/2005 | Arnaud |
| 6,896,815 B2 | 5/2005 | Cort |
| 6,902,678 B2 | 6/2005 | Tipton |
| 6,919,031 B2 | 7/2005 | Blumenschein et al. |
| 6,923,901 B2 | 8/2005 | Leffler et al. |
| 6,960,294 B2 | 11/2005 | Arnaud |
| 6,966,993 B2 | 11/2005 | Binot |
| 6,968,138 B2 | 11/2005 | Akutsu |
| 7,001,525 B2 | 2/2006 | Binot et al. |
| 7,083,715 B2 | 8/2006 | Binot |
| 7,153,431 B2 * | 12/2006 | Daugherty .................... 210/622 |
| 7,160,448 B2 | 1/2007 | Johnson |
| 7,210,581 B2 | 5/2007 | Robinson et al. |
| 7,244,362 B2 | 7/2007 | Binot |
| 7,255,793 B2 | 8/2007 | Cort |
| 7,276,165 B2 | 10/2007 | Morgoun |
| 7,309,435 B2 | 12/2007 | Rozich |
| 7,311,841 B2 | 12/2007 | Binot et al. |
| 7,323,108 B1 | 1/2008 | Garbett et al. |
| 7,407,582 B2 | 8/2008 | Sun |
| 7,407,593 B2 | 8/2008 | Frederick, Jr. et al. |
| 7,438,817 B2 | 10/2008 | Nagghappan et al. |
| 7,449,105 B2 | 11/2008 | Hastings |
| 7,476,324 B2 | 1/2009 | Ciampi et al. |
| 7,494,592 B2 | 2/2009 | Deskins |
| 7,563,366 B2 | 7/2009 | Sun |
| 7,601,261 B2 | 10/2009 | Palacios Donaque |
| 7,608,190 B1 | 10/2009 | Banerjee et al. |
| 7,625,490 B2 | 12/2009 | Cort |
| 7,648,637 B1 | 1/2010 | Sauvignet et al. |
| 7,648,638 B2 | 1/2010 | Essemiani et al. |
| 7,651,620 B2 | 1/2010 | Vion |
| 7,678,278 B2 | 3/2010 | Binot et al. |
| 7,686,079 B2 | 3/2010 | Gamache et al. |
| 7,686,960 B2 | 3/2010 | Cort |
| 7,691,261 B2 | 4/2010 | Deskins |
| 7,691,269 B2 | 4/2010 | Cort |
| 7,695,623 B2 | 4/2010 | Woodard et al. |
| 7,695,630 B2 | 4/2010 | de Guevara |
| 7,704,390 B2 | 4/2010 | Leffler et al. |
| 7,704,399 B2 | 4/2010 | Condit |
| 7,722,843 B1 | 5/2010 | Srinivasachar |
| 7,729,778 B2 | 6/2010 | Eggers et al. |
| 7,820,025 B2 | 10/2010 | Ciampi et al. |
| 7,820,053 B2 | 10/2010 | Cort |
| 7,820,054 B2 | 10/2010 | Hastings et al. |
| 7,828,976 B2 | 11/2010 | Banerjee et al. |
| 8,012,582 B2 | 9/2011 | Luo et al. |
| 8,470,172 B2 | 6/2013 | Woodard et al. |
| 8,506,800 B2 | 8/2013 | Woodard et al. |
| 8,540,877 B2 | 9/2013 | Woodard |
| 2001/0030160 A1 | 10/2001 | Wechsler et al. |
| 2002/0003115 A1 | 1/2002 | Conaway et al. |
| 2002/0017483 A1 | 2/2002 | Chesner et al. |
| 2002/0030019 A1 | 3/2002 | Keever et al. |
| 2002/0054783 A1 | 5/2002 | Gueret |
| 2002/0088758 A1 | 7/2002 | Blumenschein et al. |
| 2002/0148780 A1 | 10/2002 | Tiemeyer |
| 2002/0158025 A1 | 10/2002 | Streat |
| 2002/0170816 A1 | 11/2002 | Leffler et al. |
| 2002/0185452 A1 | 12/2002 | Johnson |
| 2002/0190004 A1 | 12/2002 | Wechsler et al. |
| 2003/0082084 A1 | 5/2003 | Cort |
| 2003/0089667 A1 | 5/2003 | Binot et al. |
| 2003/0132160 A1 | 7/2003 | Khudenko |
| 2003/0150817 A1 | 8/2003 | Keever et al. |
| 2003/0222027 A1 | 12/2003 | Streat |
| 2003/0224301 A1 | 12/2003 | Howe et al. |
| 2004/0055959 A1 | 3/2004 | Wechsler et al. |
| 2004/0055961 A1 | 3/2004 | Binot |
| 2004/0060876 A1 | 4/2004 | Tipton |
| 2004/0129642 A1 | 7/2004 | Binot |
| 2004/0144730 A1 | 7/2004 | Binot et al. |
| 2004/0149653 A1 | 8/2004 | Johnson et al. |
| 2004/0206680 A1 | 10/2004 | Johnson |
| 2004/0213721 A1 | 10/2004 | Arno et al. |
| 2005/0005471 A1 | 1/2005 | Pan |
| 2005/0035030 A1 | 2/2005 | Oder et al. |
| 2005/0045534 A1 | 3/2005 | Kin et al. |
| 2005/0051488 A1 | 3/2005 | Nagghappan et al. |
| 2005/0101719 A1 | 5/2005 | Ishihara |
| 2005/0103719 A1 | 5/2005 | Binot et al. |
| 2005/0131266 A1 | 6/2005 | Carman et al. |
| 2005/0173354 A1 | 8/2005 | Binot et al. |
| 2005/0194311 A1 | 9/2005 | Rozich |
| 2005/0218056 A1 | 10/2005 | Binot |
| 2005/0230299 A1 | 10/2005 | Saho et al. |
| 2005/0258103 A1 | 11/2005 | Cort |
| 2005/0271575 A1 | 12/2005 | Ciampi et al. |
| 2005/0277712 A1 | 12/2005 | Daly |
| 2005/0282144 A1 | 12/2005 | Wechsler et al. |
| 2006/0006114 A1 | 1/2006 | Deskins |
| 2006/0018273 A1 | 1/2006 | Yamada et al. |
| 2006/0108273 A1 | 5/2006 | Perri et al. |
| 2006/0108283 A1 | 5/2006 | Johnson et al. |
| 2006/0138047 A1 | 6/2006 | Morgoun |
| 2006/0175252 A1 | 8/2006 | Upendrakumar et al. |
| 2006/0186056 A1 | 8/2006 | Ivan |
| 2006/0213832 A1 | 9/2006 | Hudson et al. |
| 2006/0254770 A1 | 11/2006 | Hou |
| 2006/0270888 A1 | 11/2006 | Carman et al. |
| 2006/0289357 A1 | 12/2006 | Wechsler et al. |
| 2007/0039894 A1 | 2/2007 | Cort |
| 2007/0062883 A1 | 3/2007 | Frederick et al. |
| 2007/0108132 A1 | 5/2007 | de Guevara |

(56) References Cited

U.S. PATENT DOCUMENTS

| | | |
|---|---|---|
| 2007/0114184 A1 | 5/2007 | Essemiani et al. |
| 2007/0119776 A1 | 5/2007 | Isaka et al. |
| 2007/0138093 A1 | 6/2007 | Bossler et al. |
| 2007/0163955 A1 | 7/2007 | Sun |
| 2008/0019780 A1 | 1/2008 | Hastings |
| 2008/0073267 A1 | 3/2008 | Cort |
| 2008/0073268 A1 | 3/2008 | Cort |
| 2008/0073270 A1 | 3/2008 | Smith |
| 2008/0073271 A1 | 3/2008 | Cort |
| 2008/0073278 A1 | 3/2008 | Cort |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |
| 2008/0078721 A1 | 4/2008 | Binot et al. |
| 2008/0135491 A1 | 6/2008 | Cort |
| 2008/0156709 A1 | 7/2008 | Johnson |
| 2008/0164183 A1 | 7/2008 | Marston et al. |
| 2008/0164184 A1 | 7/2008 | Marston et al. |
| 2008/0203015 A1 | 8/2008 | Marston et al. |
| 2008/0210613 A1 | 9/2008 | Wechsler et al. |
| 2008/0217244 A1 | 9/2008 | Gaid |
| 2008/0257810 A1 | 10/2008 | Sun |
| 2008/0272065 A1 | 11/2008 | Johnson |
| 2008/0290030 A1 | 11/2008 | Nagghappan et al. |
| 2008/0296228 A1 | 12/2008 | Sauvignet et al. |
| 2008/0314820 A1 | 12/2008 | Prulhiere et al. |
| 2008/0314830 A1 | 12/2008 | Banerjee et al. |
| 2009/0047076 A1 | 2/2009 | Hastings |
| 2009/0050570 A1 | 2/2009 | Sauvignet |
| 2009/0065404 A1 | 3/2009 | Paspek, Jr. et al. |
| 2009/0084730 A1 | 4/2009 | Mabille et al. |
| 2009/0098262 A1 | 4/2009 | Mabille et al. |
| 2009/0127180 A1 | 5/2009 | Deskins |
| 2009/0178979 A1 | 7/2009 | Hastings et al. |
| 2009/0206040 A1 | 8/2009 | Berg et al. |
| 2009/0218281 A1 | 9/2009 | Sauvignet et al. |
| 2009/0261037 A1 | 10/2009 | Clifford, III et al. |
| 2009/0272693 A1 | 11/2009 | Mabille et al. |
| 2009/0299143 A1 | 12/2009 | Conlon et al. |
| 2009/0301948 A1 | 12/2009 | Essemiani et al. |
| 2009/0308815 A1 | 12/2009 | Sauvignet et al. |
| 2010/0038081 A1 | 2/2010 | Gamache et al. |
| 2010/0057085 A1 | 3/2010 | Holcomb et al. |
| 2010/0072142 A1 | 3/2010 | Lean et al. |
| 2010/0096335 A1 | 4/2010 | Sauvignet et al. |
| 2010/0101309 A1 | 4/2010 | Klyamkin et al. |
| 2010/0102006 A1 | 4/2010 | Quevillon |
| 2010/0155327 A1 | 6/2010 | Woodard et al. |
| 2010/0213123 A1 | 8/2010 | Marston et al. |
| 2010/0219372 A1 | 9/2010 | Hook et al. |
| 2010/0251571 A1 | 10/2010 | Woodard |
| 2010/0274209 A1 | 10/2010 | Roe et al. |
| 2011/0036771 A1 | 2/2011 | Woodard |
| 2011/0147304 A1 | 6/2011 | Sauvignet et al. |
| 2012/0067824 A1 | 3/2012 | Berg et al. |
| 2013/0020255 A1 | 1/2013 | Woodard |

FOREIGN PATENT DOCUMENTS

| | | |
|---|---|---|
| CN | 101244884 A | 8/2008 |
| CN | 101309870 A | 11/2008 |
| DE | 19600647 A1 | 7/1997 |
| EP | 12594 A1 | 6/1980 |
| EP | 0087223 A1 | 8/1983 |
| EP | 0139572 A1 | 5/1985 |
| EP | 266098 A2 | 5/1988 |
| EP | 392321 A1 | 10/1990 |
| EP | 392322 A1 | 10/1990 |
| EP | 1244601 B1 | 10/2002 |
| EP | 1785400 A1 | 5/2007 |
| EP | 2165980 A1 | 3/2010 |
| FR | 1411792 A | 9/1965 |
| FR | 2378550 A1 | 8/1978 |
| FR | 2719235 A1 | 11/1995 |
| JP | 07-299495 A | 11/1995 |
| JP | 08-257583 A | 10/1996 |
| JP | 11-169866 A | 6/1999 |
| JP | 2000-233198 A | 8/2000 |
| JP | 2001-170404 A | 6/2001 |
| JP | 2003-010874 A | 1/2003 |
| SU | 1136839 A1 | 1/1985 |
| WO | 9312041 A1 | 6/1993 |
| WO | 9735654 A1 | 10/1997 |
| WO | 9735655 A1 | 10/1997 |
| WO | 9803433 A1 | 1/1998 |
| WO | 9919261 A1 | 4/1999 |
| WO | 9931016 A1 | 6/1999 |
| WO | 0114260 A1 | 3/2001 |
| WO | 0128931 A1 | 4/2001 |
| WO | 0140121 A1 | 6/2001 |
| WO | 0200556 A1 | 1/2002 |
| WO | 0242223 A1 | 5/2002 |
| WO | 2005077835 A1 | 8/2005 |
| WO | 2005087381 A1 | 9/2005 |
| WO | 2006086384 A2 | 8/2006 |
| WO | 2006102362 A2 | 9/2006 |
| WO | 2007059141 A2 | 5/2007 |
| WO | 2007098298 A2 | 8/2007 |
| WO | 2008022192 A2 | 2/2008 |
| WO | 2008039711 A2 | 4/2008 |
| WO | 2008039936 A2 | 4/2008 |
| WO | 2008085196 A2 | 7/2008 |
| WO | 2008085197 A1 | 7/2008 |
| WO | 2008086009 A1 | 7/2008 |
| WO | 2008086010 A1 | 7/2008 |
| WO | 2009083346 A1 | 7/2009 |
| WO | 2010027895 A2 | 3/2010 |
| WO | 2010081903 A1 | 7/2010 |
| WO | 2010086249 A1 | 8/2010 |

OTHER PUBLICATIONS

U.S. Appl. No. 13/907,423, filed May 31, 2013.

U.S. Appl. No. 14/019,483, Sep. 5, 2013.

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

Catlow et al. "Ballasted Biological Treatment Process Removes Nutrients and Doubles Plant Capacity". WEFTEC Conference (Oct. 2008).

http://www.envirosim.com/includes/weftec08.htm, downloaded Dec. 16, 2012.

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, p. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

(56) References Cited

OTHER PUBLICATIONS

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

Tozer, "Study of Five Phosphorus Removal Processes," The Georgia Operator, vol. 45, No. (Winter 2008).

www.ingentaconnect.com/content/wef/wefproc/2009/00002009/00000004/art0020, downloaded Dec. 16, 2012.

* cited by examiner

BALLASTED ANAEROBIC METHOD FOR TREATING WASTEWATER

RELATED APPLICATIONS

This application is a divisional of U.S. patent application Ser. No. 13/627,766, filed Sep. 26, 2012, now U.S. Pat. No. 8,623,205, issued Jan. 7, 2014, titled "Ballasted Anaerobic System", which is a continuation of U.S. patent application Ser. No. 12/799,582, filed Apr. 27, 2010, titled "Ballasted Anaerobic System and Method of Treating Wastewater", which is a continuation-in-part of U.S. patent application Ser. No. 12/584,545, filed Sep. 8, 2009, now U.S. Pat. No. 8,470,172, issued Jun. 25, 2013, titled "System for Enhancing A Wastewater Treatment Process", which is a continuation-in-part of U.S. patent application Ser. No. 12/008,216, filed Jan. 9, 2008, now U.S. Pat. No. 7,695,623, issued Apr. 13, 2010, titled "System and Method For Enhancing An Activated Sludge Process", which claims benefit and priority of U.S. Provisional Application Ser. No. 60/879,373, filed Jan. 9, 2007, titled "Process For The Biochemical Treatment Of Wastewater", and also claims benefit of and priority to U.S. Provisional Application Ser. No. 60/994,553, filed Sep. 20, 2007, titled "Process For Enhanced Biochemical Treatment Of Wastewater", all of which are incorporated by reference herein.

FIELD OF THE INVENTION

This invention relates to a ballasted anaerobic system and method for treating wastewater.

BACKGROUND OF THE INVENTION

One method of treating wastewater, such as wastewater from ethanol plants, breweries, pharmaceutical plants, food processing plants, pulp and paper facilities, and the like, is to use an anaerobic treatment reactor. The anaerobic treatment reactor is typically seeded with a population of microorganisms that ingest contaminants in the influent wastewater to form biological flocs or granules (hereinafter "biological flocs"). Wastewater is typically fed into the bottom of the anaerobic treatment reactor and microorganisms consume the waste therein and from biological flocs. After a sufficient startup period, the biological flocs form an anaerobic sludge blanket near the bottom of the anaerobic treatment reactor.

In operation, wastewater is fed into the bottom of the anaerobic treatment reactor and flows upward through the anaerobic sludge blanket bringing the wastewater in contact with the microorganisms that consume the waste therein. The treated wastewater then flows over the weir of the anaerobic treatment reactor as clean effluent.

Conventional anaerobic treatment reactor systems have a limited difference in the specific gravity between the anaerobic sludge blanket and the influent wastewater. Therefore, if the flow rate of the influent wastewater is too high, the limited specific gravity difference can cause the sludge blanket to become diffuse. The result may be an elevated loss of microorganisms over the weir which can result in compromised treatment efficiency and system capacity.

BRIEF SUMMARY OF THE INVENTION

This invention features a ballasted anaerobic system for treating wastewater including at least one anaerobic treatment reactor. A weighting agent impregnation subsystem is configured to mix weighting agent with the biological flocs to form weighted biological flocs to create a weighted anaerobic sludge blanket in the at least one anaerobic treatment reactor. A weighting agent recovery subsystem is configured to recover the weighting agent from excess sludge and reintroduce the weighting agent to the weighting agent impregnation subsystem.

In one embodiment, the weighted anaerobic sludge blanket may be configured to treat wastewater and provide a treated effluent. The weighting agent impregnation subsystem may include an impregnation tank and at least one mixer. The weighting agent impregnation subsystem may include a storage subsystem for storing virgin weighting agent and dispensing the virgin weighting agent into the impregnation tank. The weighting agent impregnation subsystem may include a venturi mixer/eductor. The weighting agent recovery subsystem may include a separator subsystem for separating the weighting agent from the biological flocs. The separator subsystem may include a shear mill. The separator subsystem may include a centrifugal separator. The separator subsystem may include an ultrasonic separator. The separator subsystem may include a shear mill and a wet drum magnetic separator. The separator subsystem may include a shear mill and a centrifugal separator. The separator subsystem may include an ultrasonic separator and a wet drum magnetic separator. The separator subsystem may include an ultrasonic separator and a centrifugal separator. The shear mill may include a rotor and a stator, wherein the rotor and/or the stator includes slots sized as to optimize separation of weighting agent from the weighted biological flocs. A majority of the weighting agent may have a particle size less than about 100 µm. A majority of the weighting agent may have a particle size less than about 40 µm. A majority of the weighting agent may have a particle size less than about 20 µm. The weighting agent may include magnetite. The system may include a wasting subsystem for wasting excess sludge to control the population of microorganisms. The capacity of the system may be increased by increasing the concentration of microorganisms solids in the anaerobic treatment reactor by reducing the amount of the sludge wasted by the wasting subsystem. The weighted biological flocs may enhance the quality of the treated effluent by reducing suspended solids and associated contaminants therein.

This invention also features a ballasted anaerobic method for treating wastewater, the method including the steps of: a) receiving influent wastewater in at least one biological reactor, b) forming biological flocs in the at least one anaerobic treatment reactor, c) impregnating weighting agent into the biological flocs to form weighted biological flocs to create a weighted anaerobic sludge blanket, and d) recovering weighting agent from the weighted biological flocs to reintroduce the weighting agent to step c).

In one embodiment, the method may include the step of directing the wastewater through the weighted anaerobic sludge blanket to provide a treated effluent. The method may include the step of separating the weighting agent from the weighted biological flocs. The method may include the step of collecting the weighting agent and recycling the weighting agent to step c). The method may further include the step of providing weighting agent in which the majority of the weighting agent has a particle size less than about 100 µm. The method may further include the step of providing weighting agent in which the majority of the weighting agent has having a particle size less than about 40 µm. The method may further include the step of providing weighting agent in which the majority of the weighting agent has having a particle size less than about 20 µm. The method may further include the step of enhancing the quality of the treated effluent by reducing suspended solids and associated contaminants therein.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
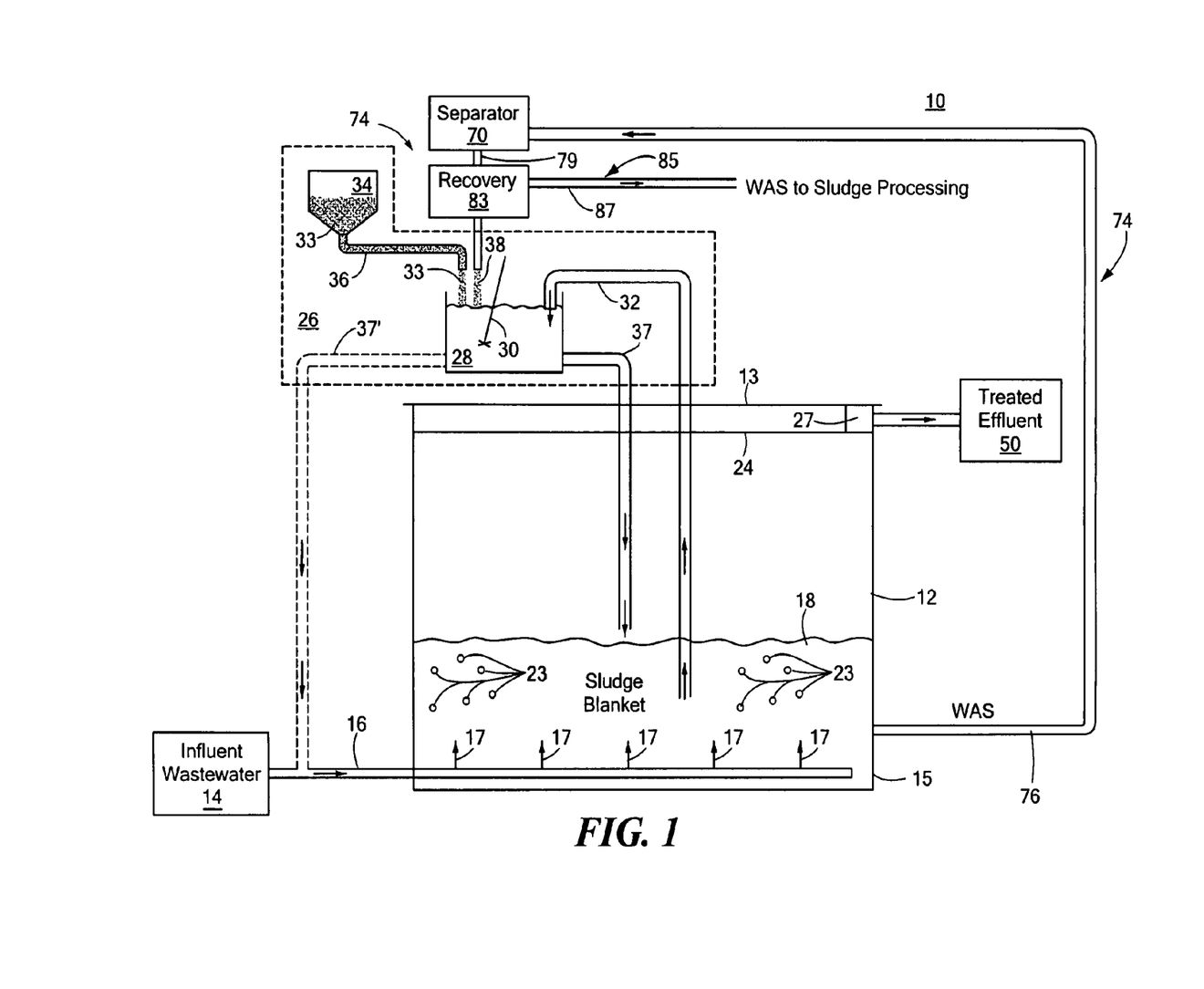
FIG. 1 is a schematic side-view of one embodiment of the ballasted anaerobic system for treating wastewater of this invention.

There is shown in FIG. 1 one embodiment of ballasted anaerobic system 10 for treating wastewater of this invention. System 10 includes at least one anaerobic treatment reactor 12, e.g., a bulk volume fermenter (BVF) treatment reactor, an up-flow anaerobic sludge blanket (UASB) treatment reactor, an internal circulation (IC) treatment reactor, an anaerobic contactor, a continuous stirred reactor, or similar type reactor. Anaerobic treatment reactor 12 receives flow of influent wastewater 14 by line 16. Anaerobic treatment reactor 12 is preferably covered as shown at 13 to create an anaerobic environment therein. Influent wastewater 14 is typically high strength wastewater from ethanol plants, breweries, pharmaceutical plants, pulp and paper facilities, or any similar type facilities or plants. Influent wastewater 14 is typically fed into bottom 15 of anaerobic treatment reactor 12 by line 16 and flows in an upward direction, as shown by arrows 17. Anaerobic treatment reactor 12 is preferably seeded with population of microorganisms which promotes growth of biological flocs 23. After a sufficient startup period, sludge blanket 18 forms near bottom 15 of anaerobic treatment reactor 12.

Figure 2A:
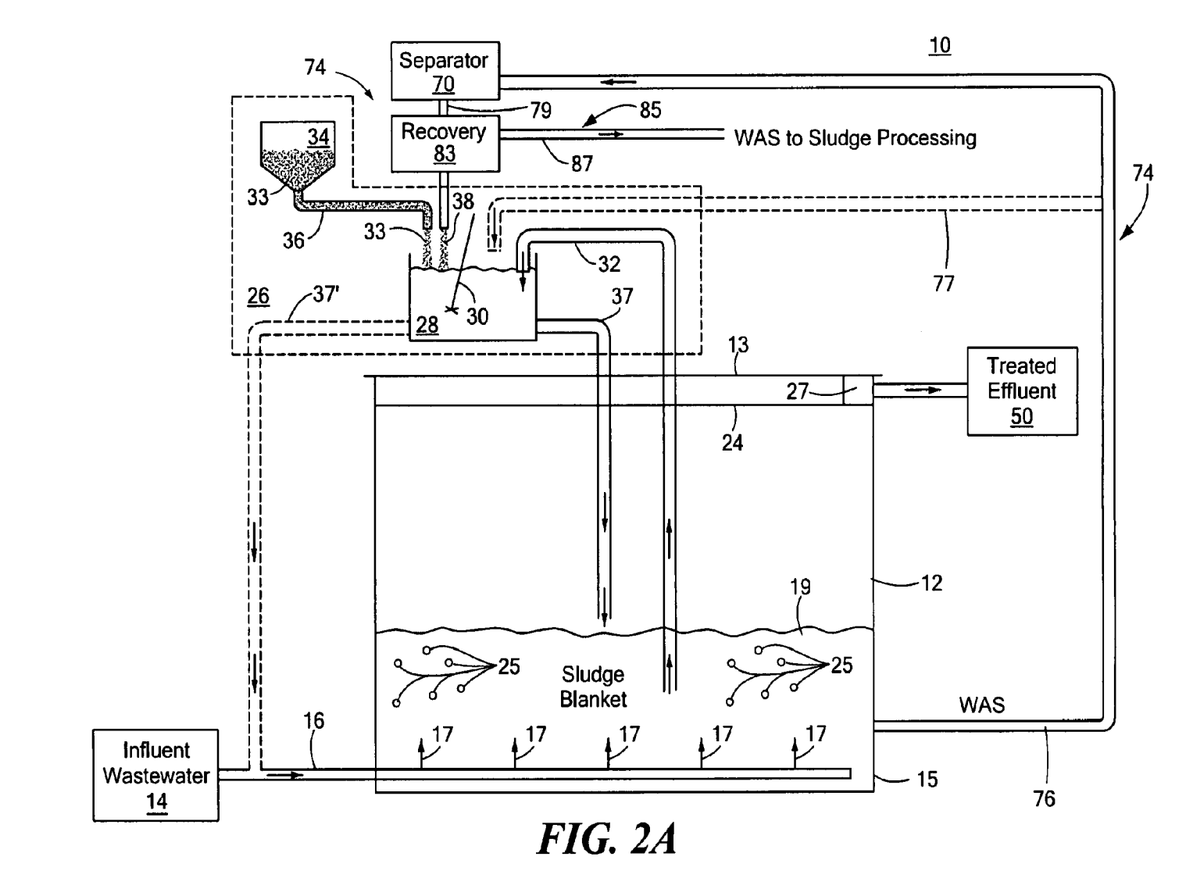
FIG. 2A is a schematic side-view showing in one example of a weighted sludge blanket formed at the bottom of the anaerobic treatment reactor shown in FIG. 1.
Figure 3:
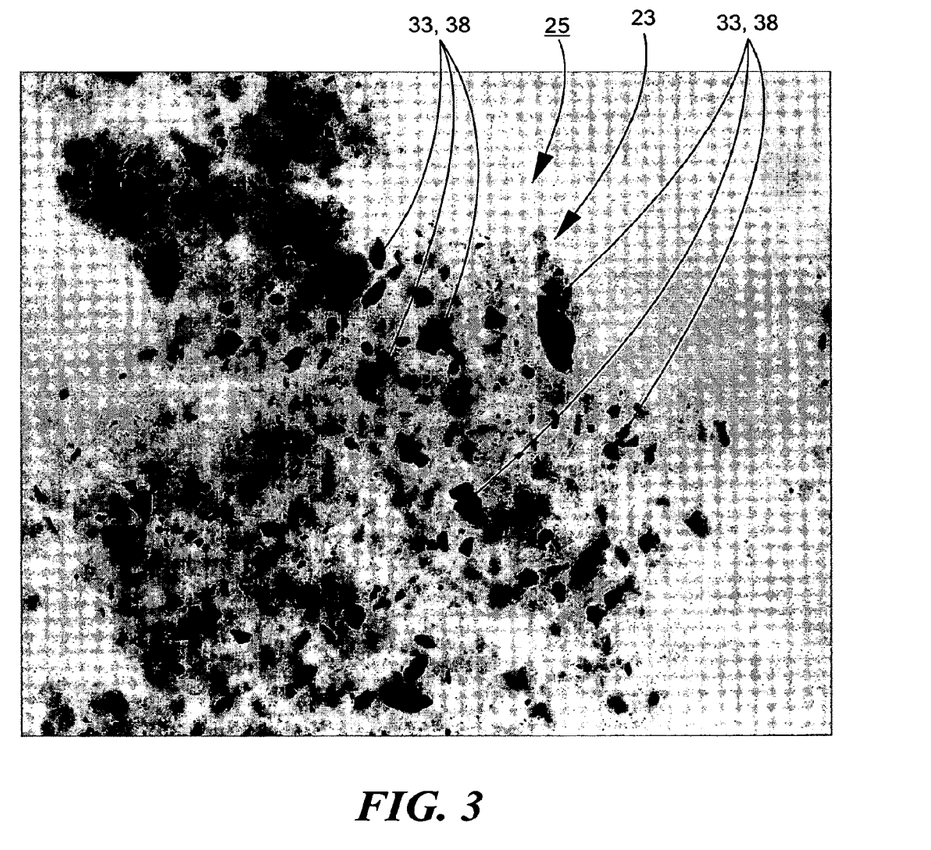
FIG. 3 is a microscopic photograph showing one example of weighting agent impregnated into biological flocs to form weighted biological flocs in accordance with this invention.
Figure 4:
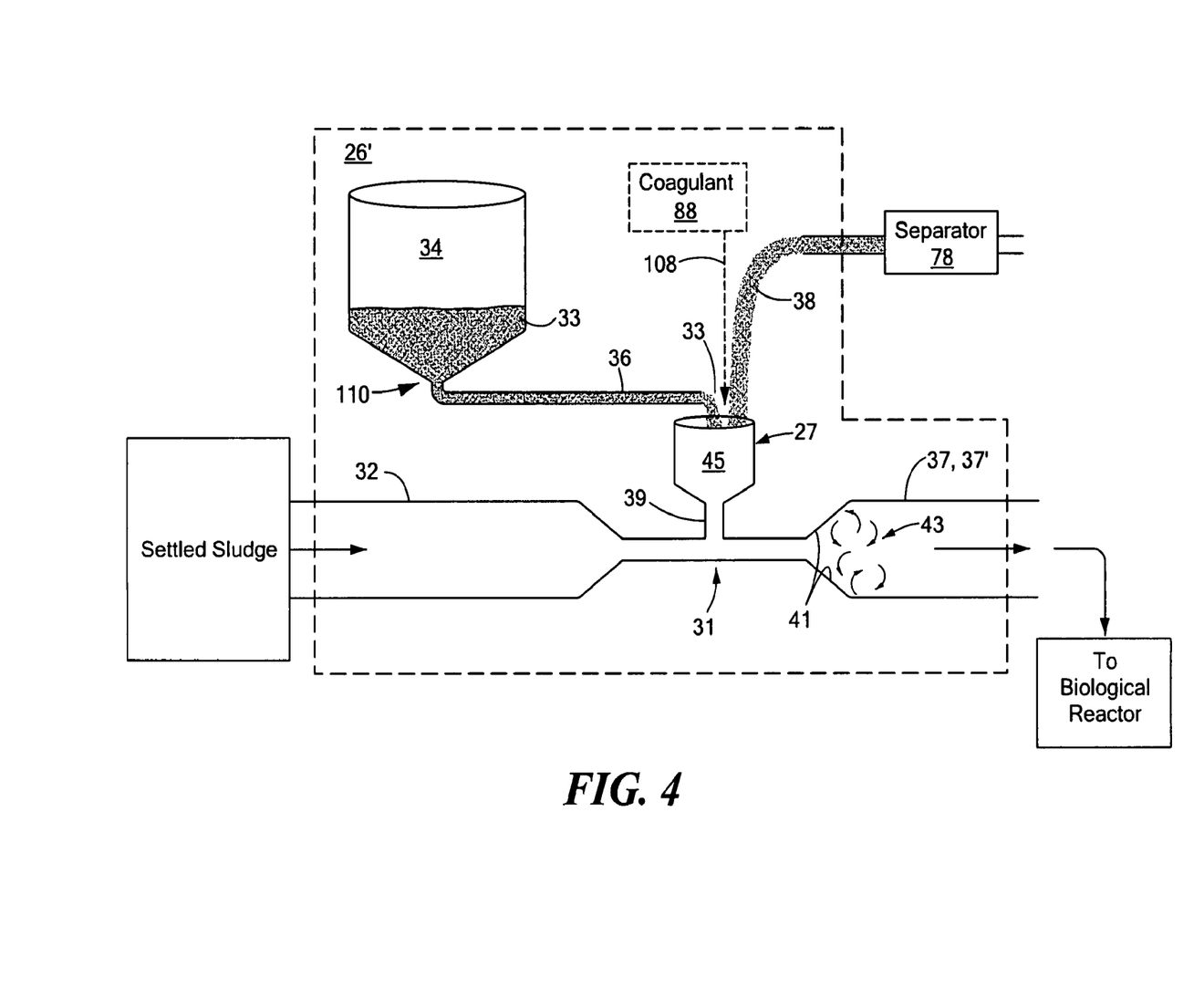
FIG. 4 is a schematic side-view showing another embodiment of the weighting agent impregnation subsystem shown in FIG. 1.
Figure 5A:
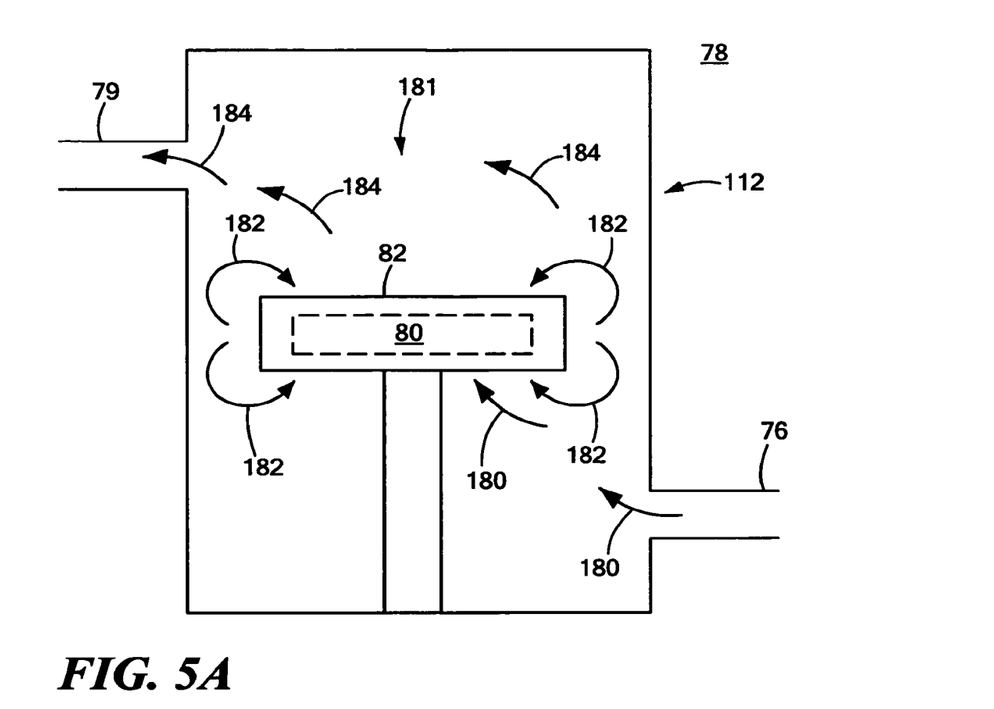
FIG. 5A is a schematic side-view of one embodiment of the separator shown in FIG. 1.
Figure 5B:
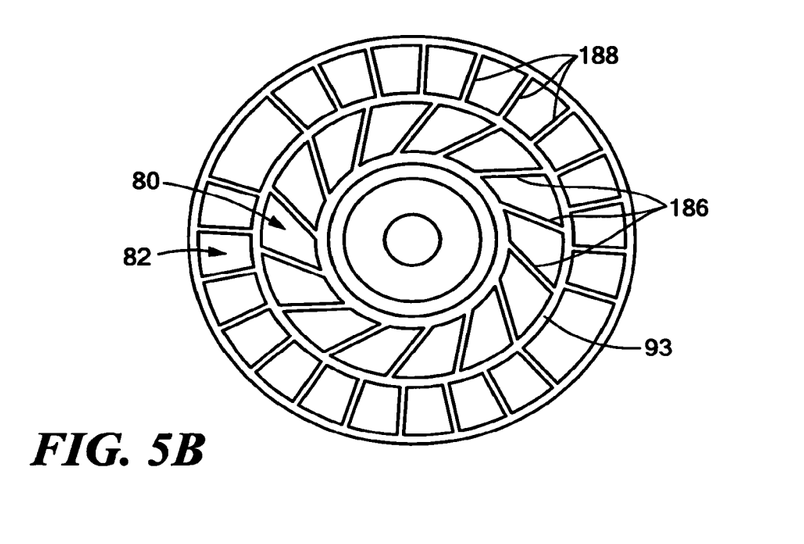
FIG. 5B is a schematic top view showing one example of slots in the rotor and stator of the shear mill shown in FIG. 5A.
Figure 5C:
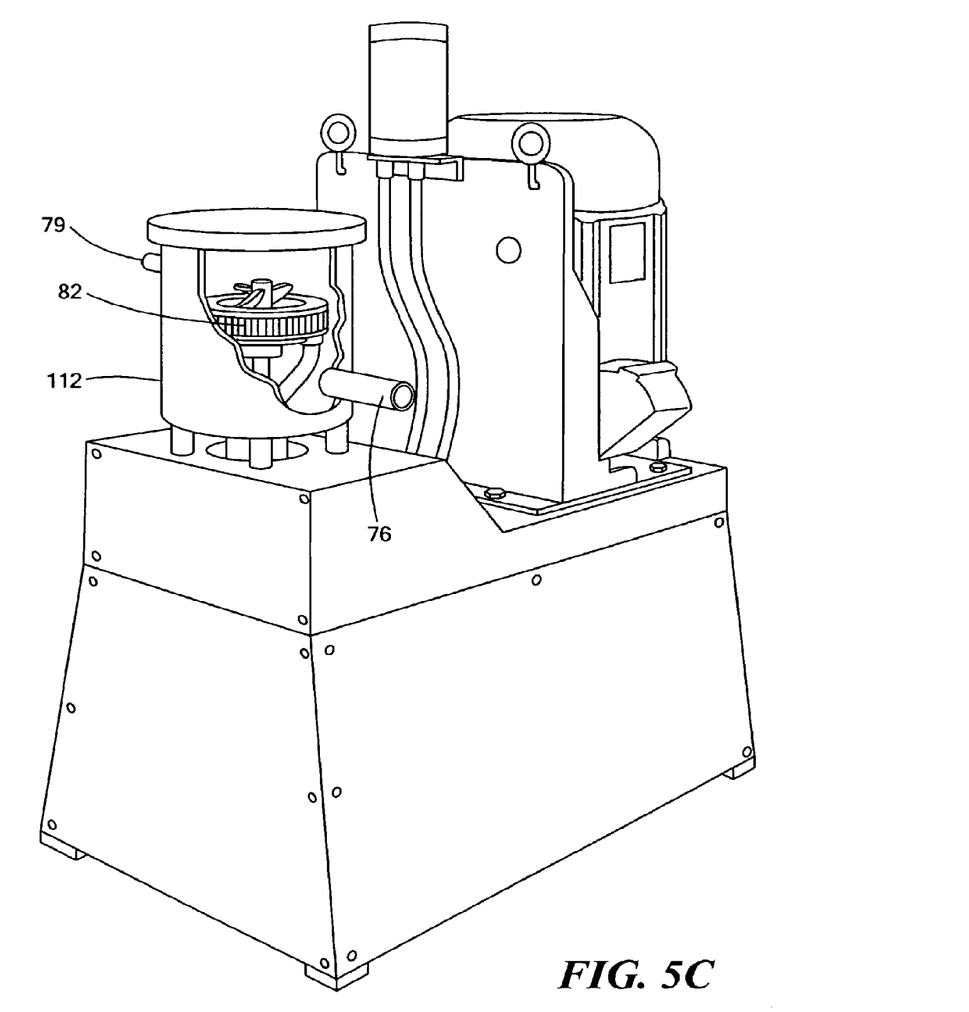
FIG. 5C is a three-dimensional view of one embodiment of the shear mill in FIG. 5A.
Figure 6:
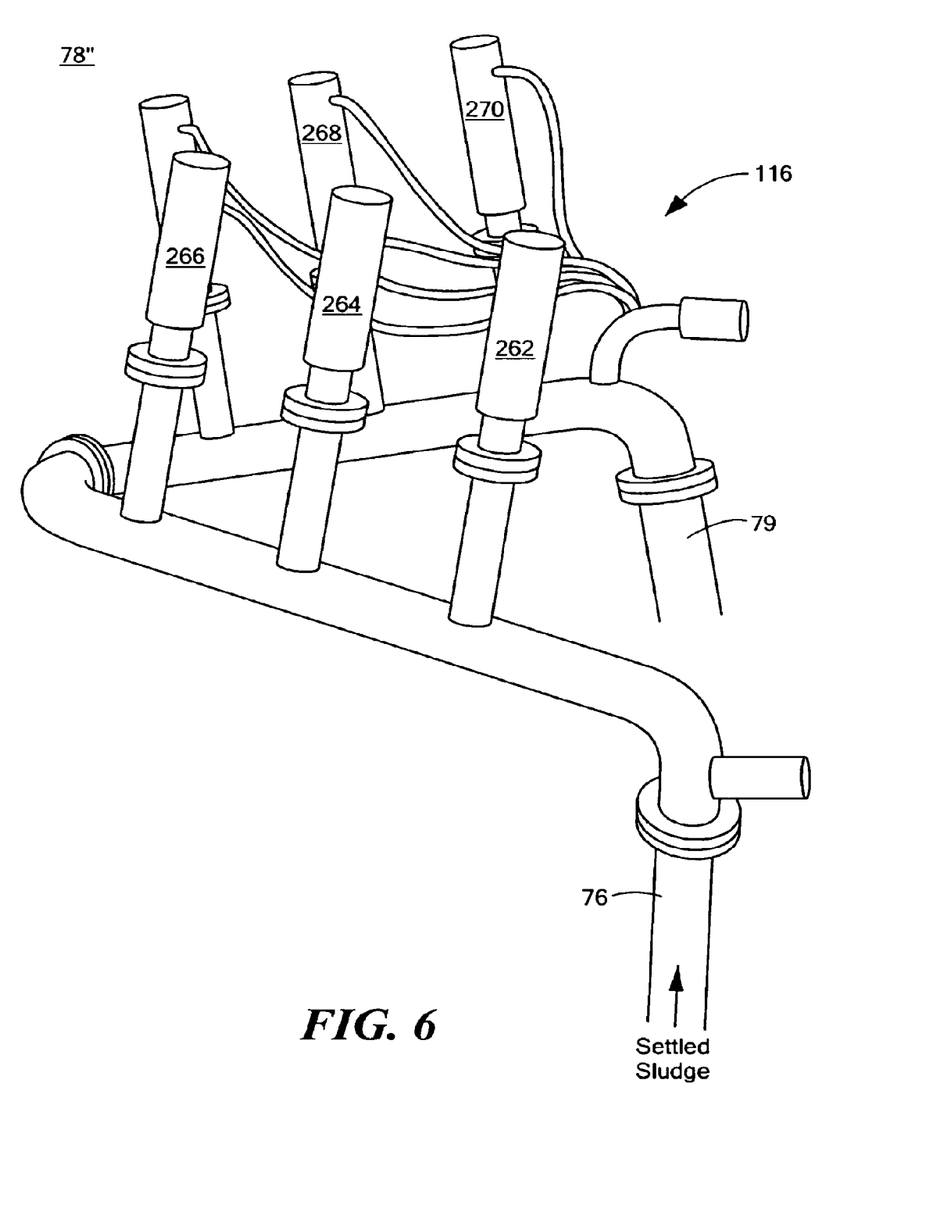
FIG. 6 is a three-dimensional front-view of another embodiment of the separator shown in FIG. 1.
Figure 7:
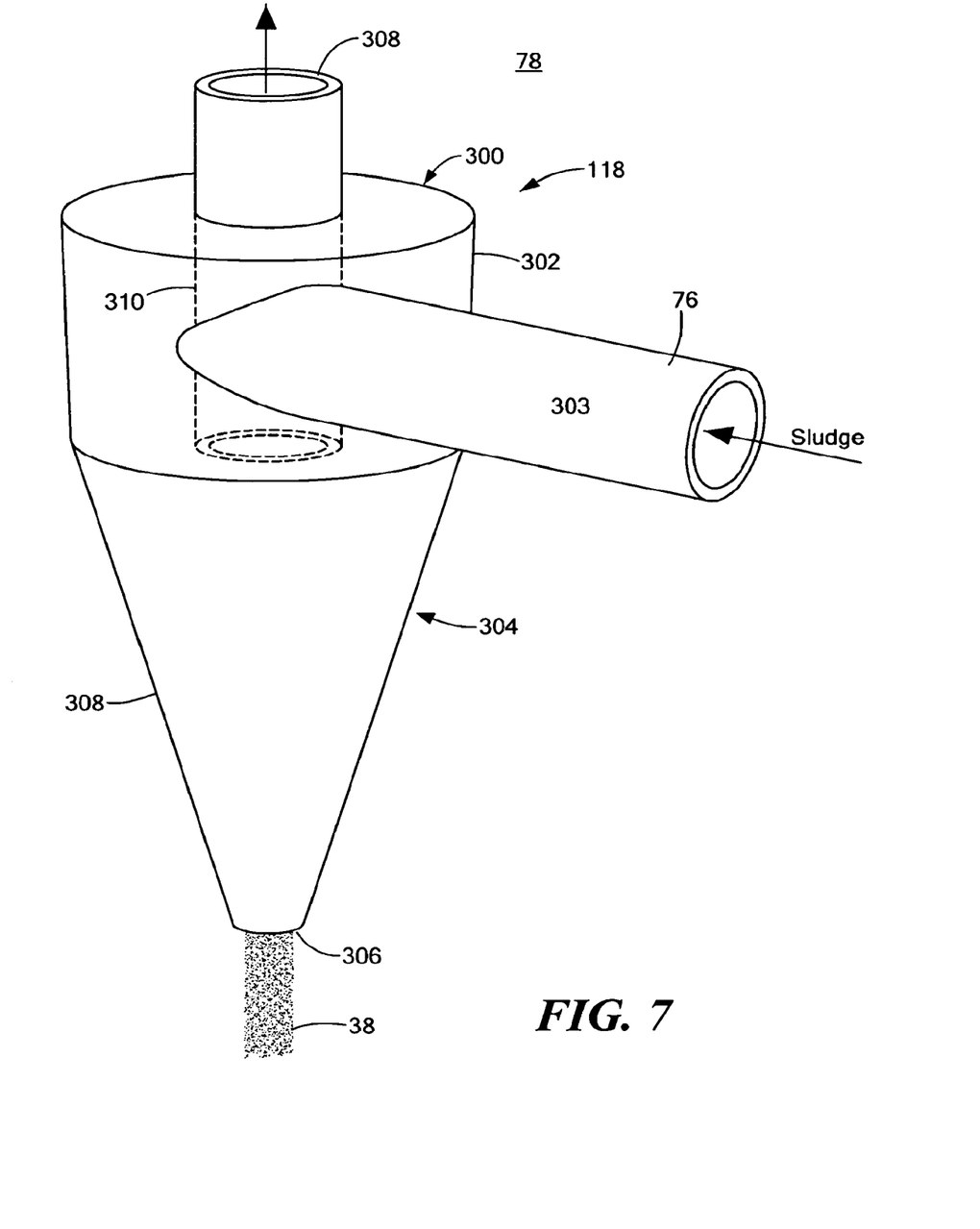
FIG. 7 is a three-dimensional front-view of yet another embodiment of the separator shown in FIG. 1.

To overcome the problems discussed in the Background section above, system 10 includes weighting agent impregnation subsystem 26 which impregnates biological flocs 23 to form weighted biological flocs 25, FIG. 2A, to create weighted anaerobic sludge blanket 19. Weighting agent impregnation subsystem 26, FIGS. 1 and 2A, in one embodiment, includes impregnation tank 28 and mixer 30 which receives biological flocs from anaerobic sludge blanket 18, FIG. 1, and/or from weighted anaerobic sludge blanket 19, FIG. 2A, by line 32. Impregnation tank 28 also preferably receives virgin weighting agent 33, e.g., from feed hopper 34 by line 36, and/or recycled weighting agent 38 from weighting agent recovery subsystem 74 (discussed below). Mixer 30 mixes the biological flocs with virgin weighting agent 33 and/or with recycled weighting agent 38 in impregnation tank 28 to impregnate the weighting agent into the biological flocs to form weighted biological flocs 25. In one example, mixer 30 utilizes a mixing energy which is sufficient to impregnate the weighting agent into biological flocs to form weighted biological flocs. FIG. 3 shows a microscopic view of one example of weighting agent 33, 38 impregnated into biological flocs 23 to form weighted biological floc 25. The weighted biological flocs are then sent back to anaerobic treatment reactor 12 by line 37 and/or line 37' connected to line 16 to form weighted anaerobic sludge blanket 19, FIG. 2A.

Figure 2B:
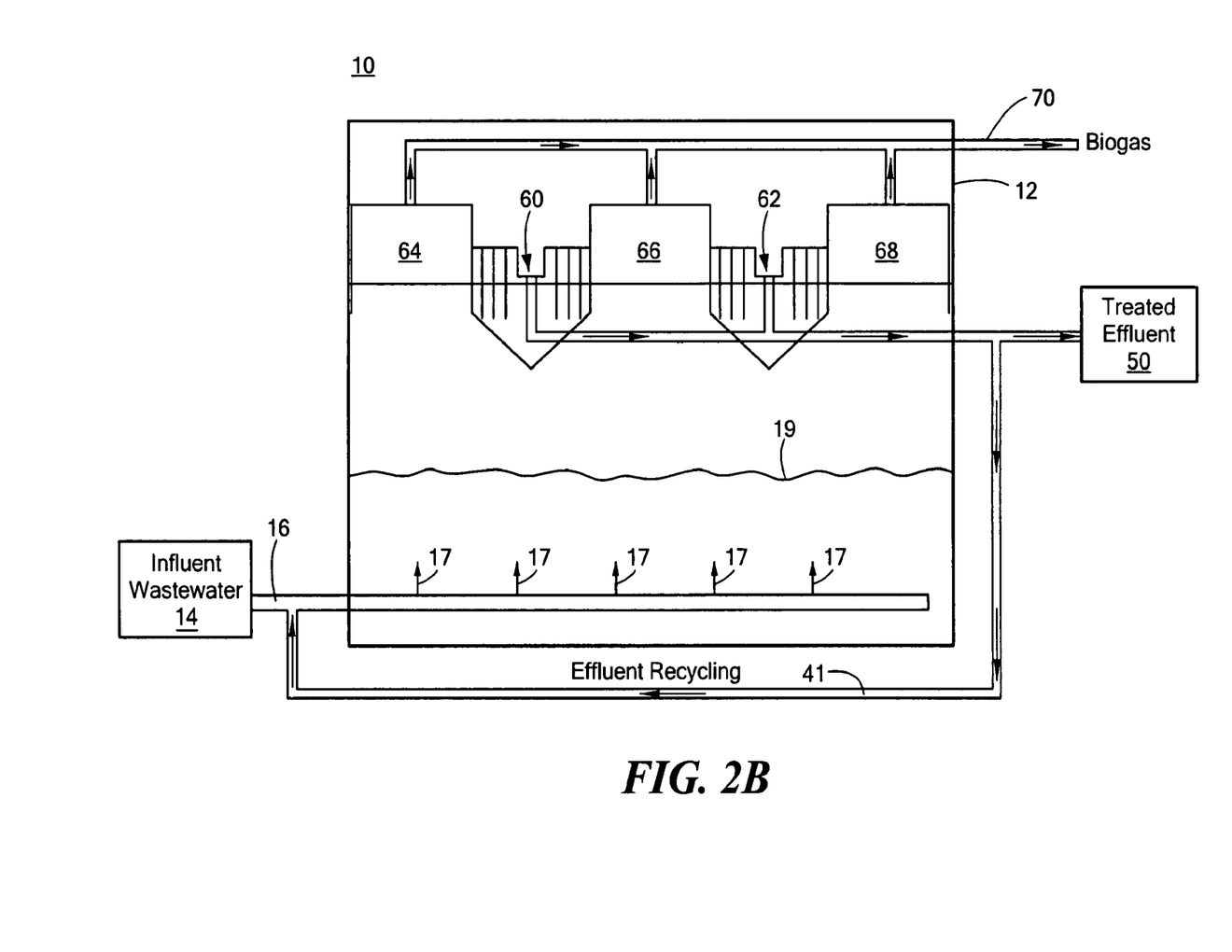
FIG. 2B is a schematic side-view of the system for treating wastewater shown in FIGS. 1 and 2A depicting one example of an effluent recycling line and gas collectors.

In operation, influent wastewater 14 is fed into bottom 15 of anaerobic treatment reactor 12 by line 16 and flows upward through weighted anaerobic sludge blanket 19 bringing the wastewater in contact with the microorganisms that consume the waste therein to provide treated effluent 50 which flows over weir 27. In one design, anaerobic treatment reactor 12, FIG. 2B, may include weirs 60 and 62 which treated effluent 50 flows over. Anaerobic treatment reactor 12 may also include one or more gas collectors 64, 66, and 68 coupled to line 70 which remove methane, carbon dioxide, and other gases generated by the anaerobic process of system 10 discussed herein. Treated effluent 50 may be recycled by line 41 to line 16 to maintain a constant upflow velocity in anaerobic treatment reactor 12, e.g., as shown by arrows 17. Recycling treated effluent 50 may also be used to adjust the flow rate of the influent in line 16.

Increasing the density of weighted anaerobic sludge blanket 18, FIG. 1, to form weighted anaerobic sludge blanket 19, FIG. 2A, creates a significant difference between the specific gravities of the influent wastewater 14 and weighted anaerobic sludge blanket 19. The result is system 10 can accommodate higher loading rates (flow rate/reactor size) of influent wastewater while preventing weighted sludge blanket 19 from becoming diffuse. Therefore, system 10 is more efficient and effective than conventional anaerobic treatment reactor systems. The weighted biological flocs in weighted anaerobic sludge blanket 19 also improve the quality of the treated effluent by reducing suspended solids and associated contaminants therein.

In one embodiment, the weighting agent may be magnetite, or any similar type weighting agent or magnetically separable inorganic material known to those skilled in the art which increases the density of the biological flocs. In one example, the majority of the weighting agent particles have a size less than about 100 μm. In other examples, the majority of weighting agent particles has a size less than about 40 μm, or the majority of particle size of the weighting agent may be less than about 20 μm.

Weighting agent recovery subsystem 74 preferably includes separator 78 which recovers the weighting agent from the excess weighted biological flocs in line 76 and reintroduces (recycles) the weighting agent to weighting agent impregnation subsystem 26. Weighting agent recovery subsystem 74 may include recovery subsystem 83, e.g., a wet drum magnetic separator or similar type device, which recovers the excess weighted biological flocs processed by separator 78. Recovery subsystem 83 reintroduces recovered weighting agent 38 to weighting agent impregnation subsystem 26.

System 10 also preferably includes wasting subsystem 85 which wastes the excess sludge in line 76 generated by weighting agent recovery subsystem 74 by line 87 to control the population of microorganisms in anaerobic treatment reactor 12. In one example, the capacity of system 10 may be increased by increasing the concentration of microorganisms in weighted anaerobic sludge blanket 19 by reducing the amount of sludge wasted by wasting subsystem 85.

System 10, FIG. 1, may also utilize weighting agent impregnation subsystem 26', FIG. 4, where like parts have been given like numbers. In this example, weighting agent impregnation subsystem 26' includes venturi mixer/eductor 27 with nozzle 31 and funnel 45 which receives virgin weighting agent 33, e.g., from tank 34 by line 36, and/or recycled weighting agent 38 from separator 78. Venturi mixer/eductor 27 preferably receives sludge from anaerobic sludge blanket 18, FIG. 1, and/or from anaerobic sludge blanket 19, FIG. 2A, by line 32.

In operation, the velocity of sludge in line 32 is increased through nozzle 31. Virgin weighting agent 33 and/or recycled weighting agent 38 is dispensed into funnel 45 and then enters nozzle 31 by line 39 and travels downstream to line 37 and/or line 37' as shown in FIGS. 1 and 2A. The widening of line 37, 37', FIG. 4, shown at 41 induces intimate mixing and entrainment, as shown at 43. This impregnates the virgin and/or recycled weighting agent into the biological flocs to form weighted biological flocs. The weighted biological flocs are then returned to anaerobic treatment reactor 12 by line 37, and/or line 37', FIGS. 1 and 2A, to form weighted anaerobic sludge blanket 19, FIG. 2A.

In one design, separator subsystem 78 discussed above may be configured as shear mill 112, FIG. 5A, which shears the sludge in line 76 to separate the weighting agent from the weighted biological flocs. Shear mill 112 ideally includes rotor 80 and stator 82. In operation, the excess sludge in line 76 enters shear mill 112 and flows in the direction of arrows 180 and enters rotor 80 and then stator 82. Shear mill 112 is designed such that there is a close tolerance between rotor 80, FIG. 5B and stator 82, as shown at 93. Rotor 80 is preferably driven at high rotational speeds, e.g., greater than about 1,000 r.p.m. to form a mixture of weighting agent and obliterated flocs in area 181, FIG. 5A, of shear mill 112. The mixture of weighting agent and obliterated flocs exits shear mill 112 by line 79, as shown by arrows 184. FIG. 5C shows in further detail the structure of one embodiment of shear mill 112. Preferably, rotor 80, FIGS. 5A-5C, and/or stator 82 includes slots which function as a centrifugal pump to draw the excess sludge from above and below rotor 80 and stator 82, as shown by paths 182, FIG. 5A, and then hurl the materials off the slot tips at a very high speed to break the weighted biological flocs into the mixture of weighting agent and obliterated flocs. For example, rotor 80, FIG. 5B, may include slots 186, and stator 82 may include slots 188. Slots 186 in rotor 80 and/or slots 188 in stator 82 are preferably optimized to increase shear energy to efficiently separate the weighting agent from the weighted biological flocs. The shear developed by rotor 80 and stator 82 depends on the width of slots 186 and 188, the tolerance between rotor 80 and stator 82, and the rotor tip speed. The result is shear mill 112 provides a shearing effect which effectively and efficiently separates the weighting agent from the weighted biological flocs to facilitate recovery of the weighting agent.

In another design, separator subsystem 78, FIG. 6, where like parts have been given like numbers, may be configured as ultrasonic separator 116. Ultrasonic separator 116 typically includes one or more ultrasonic transducers, e.g., ultrasonic transducer 262, 264, 266, 268, and/or 270, available from Hielscher Ultrasonics GmbH, Stuttgart, Germany, which generates fluctuations of pressure and cavitation in the excess sludge in line 76. This results in microturbulences that produce a shearing effect to create a mixture of weighting agent and obliterated flocs to effectively separate the weighting agent from the weighted biological flocs in the excess sludge. The resulting mixture of weighting agent and obliterated flocs exits ultrasonic separator 116 by line 79.

In yet another design, separator subsystem 78, FIG. 7, where like parts have been given like numbers, may be configured as centrifugal separator 118. Centrifugal separator 114 typically includes cylindrical section 302 located at the top of hydrocyclone 300 and conical base 304 located below section 302. The excess sludge in line 76 is fed tangentially into cylindrical section 302 via port 303. Smaller exit port 306 (underflow or reject port) is located at the bottom of conical section 304 and larger exit port 308 (overflow or accept port) is located at the top of cylindrical section 302.

In operation, the centrifugal force created by the tangential feed of the sludge by port 303 causes the denser weighting agent to be separated from the biological flocs in the excess sludge. The separated weighting agent is expelled against wall 308 of conical section 304 and exits at port 306. This effectively separates the weighting agent from the weighted biological flocs. The recovered weighting agent 38 exits via port 306 and may be deposited to weighting agent impregnation system 26, 26', FIGS. 1 and 4. The less dense biological flocs remain in the sludge and exit via port 308 through tube 310 extending slightly into the body of the center of centrifugal separator 118.

Although as discussed above, separator subsystem 78 may be configured as a shear mill, an ultrasonic separator, or a centrifugal separator, this is not a necessary limitation of this invention. In other designs, separator subsystem 78 may be configured as a tubular bowl, a chamber bowl, an imperforate basket, a disk stack separator, and the like, as known by those skilled in the art.

In the example above where a separator 78, FIGS. 5A-5C, is configured as shear mill 112 to create the mixture of weighting agent and obliterated biological flocs, a wet drum magnetic separator or centrifugal separator 118, FIG. 7, may be used to recover the weighting agent therefrom.

In the example where separator subsystem 78, FIG. 6, is configured as an ultrasonic separator 116 to create the mixture of weighting agent and obliterated biological flocs, a wet drum magnetic separator or centrifugal separator 118, FIG. 7, may be used to recover the weighting agent therefrom.

The result of recovering and recycling the weighting agent as discussed above with reference to FIGS. 5A-7 significantly reduces the operating costs of wastewater treatment system 10.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A ballasted anaerobic method for treating wastewater, the method comprising:
  receiving influent wastewater in at least one anaerobic treatment reactor;
  forming biological flocs in the at least one anaerobic treatment reactor; and
  impregnating weighting agent into the biological flocs to form weighted biological flocs;
  allowing the weighted biological flocs to settle to create a weighted anaerobic sludge blanket; and
  directing the wastewater through the weighted anaerobic sludge blanket to provide a treated effluent.

2. The method of claim 1 further including the step of recycling the weighting agent.

3. The method of claim 1 further including the step of providing weighting agent in which the majority of the weighting agent has a particle size less than about 100 µm.

4. The method of claim 1 further including the step of providing weighting agent in which the majority of the weighting agent has a particle size less than about 40 µm.

5. The method of claim 1 further including the step of providing weighting agent in which the majority of the weighting agent has a particle size less than about 20 µm.

6. The method of claim 1 further including the step of enhancing the quality of the treated effluent by reducing suspended solids and associated contaminants therein.

7. The method of claim 1, further comprising wasting excess sludge from the at least one anaerobic treatment reactor.

* * * * *